United States Patent
Xue et al.

(10) Patent No.: US 12,141,438 B2
(45) Date of Patent: Nov. 12, 2024

(54) ZERO SKIPPING TECHNIQUES FOR REDUCING DATA MOVEMENT

(71) Applicant: Alibab Group Holding Limited, Grand Cayman (KY)

(72) Inventors: Fei Xue, Sunnyvale, CA (US); Fei Sun, San Jose, CA (US); Yangjie Zhou, Shanghai (CN); Lide Duan, Sunnyvale, CA (US); Hongzhong Zheng, Los Gatos, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 133 days.

(21) Appl. No.: 17/779,523

(22) PCT Filed: Feb. 25, 2021

(86) PCT No.: PCT/CN2021/077990
§ 371 (c)(1),
(2) Date: May 24, 2022

(87) PCT Pub. No.: WO2022/178791
PCT Pub. Date: Sep. 1, 2022

(65) Prior Publication Data
US 2023/0161479 A1    May 25, 2023

(51) Int. Cl.
*G06F 3/06* (2006.01)
(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
USPC ....................................................... 711/154
See application file for complete search history.

(56) References Cited

U.S. PATENT DOCUMENTS

| | | | |
|---|---|---|---|
| 5,642,306 A * | 6/1997 | Mennemeier | G06F 7/523 708/620 |
| 9,363,679 B2 | 6/2016 | Giannakis et al. | |
| 10,013,652 B2 * | 7/2018 | Vlietinck | G10L 15/16 |
| 10,528,054 B2 | 1/2020 | Zou | |
| 10,685,082 B2 * | 6/2020 | Bekas | G06F 17/16 |
| 2015/0006443 A1 | 1/2015 | Rose et al. | |
| 2017/0053418 A1 | 2/2017 | Narsimharao et al. | |
| 2017/0099113 A1 | 4/2017 | Letourneau | |
| 2017/0192793 A1 * | 7/2017 | Chilimbi | G06F 9/3802 |
| 2017/0193361 A1 | 7/2017 | Chilimbi et al. | |
| 2018/0173677 A1 | 6/2018 | Muralimanohar | |
| 2018/0181864 A1 | 6/2018 | Mathew et al. | |
| 2019/0042542 A1 * | 2/2019 | Narayanamoorthy | G06N 3/00 |
| 2019/0130271 A1 | 5/2019 | Narang et al. | |
| 2019/0164538 A1 | 5/2019 | Seo et al. | |
| 2019/0205746 A1 | 7/2019 | Nurvitadhi et al. | |

(Continued)

FOREIGN PATENT DOCUMENTS

| | | |
|---|---|---|
| CN | 107704916 A | 2/2018 |
| WO | 2013101018 A1 | 7/2013 |
| WO | 2020190809 A1 | 9/2020 |

*Primary Examiner* — Christopher B Shin

(57) ABSTRACT

Zero skipping sparsity techniques for reduced data movement between memory and accelerators and reduced computational workload of accelerators. The techniques include detection of zero and near-zero values on the memory. The non-zero values are transferred to the accelerator for computation. The zero and near-zero values are written back within the memory as zero values.

20 Claims, 9 Drawing Sheets

(56) References Cited

U.S. PATENT DOCUMENTS

| | | |
|---|---|---|
| 2019/0392323 A1 | 12/2019 | Yan et al. |
| 2020/0104692 A1 | 4/2020 | Hill et al. |
| 2020/0159812 A1 | 5/2020 | Zarar et al. |
| 2020/0210517 A1* | 7/2020 | Baum .................. G06F 9/3802 |
| 2020/0293105 A1 | 9/2020 | Ambardekar et al. |
| 2020/0301994 A1 | 9/2020 | Dikici et al. |
| 2020/0342327 A1 | 10/2020 | Dong et al. |
| 2021/0004668 A1 | 1/2021 | Moshovos et al. |
| 2021/0011971 A1 | 1/2021 | Lai |
| 2021/0103550 A1* | 4/2021 | Appu .................... G06F 9/3016 |
| 2021/0191724 A1* | 6/2021 | Pal ........................ G06F 9/3001 |
| 2021/0342417 A1* | 11/2021 | Narayanamoorthy ...................... G06F 9/3001 |
| 2022/0044090 A1* | 2/2022 | Yoo .......................... G06N 3/02 |
| 2022/0222533 A1* | 7/2022 | Yoo ........................ G06N 3/063 |

\* cited by examiner $$B = \begin{pmatrix} a_{0,0} & \cdots & a_{0,c-1} \\ a_{1,0} & \cdots & a_{1,c-1} \\ a_{2,0} & \cdots & a_{2,c-1} \\ \vdots & \ddots & \vdots \\ a_{r-1,0} & \cdots & a_{r-1,c-1} \end{pmatrix} \cdot \begin{bmatrix} x_0 \\ x_1 \\ x_2 \\ \vdots \\ x_{r-1} \end{bmatrix} = \begin{bmatrix} x_0 a_{0,0} + x_1 a_{1,0} + x_2 a_{2,0} + \cdots + x_{r-1} a_{r-1,0} \\ \vdots \\ x_0 a_{0,c-1} + x_1 a_{1,c-1} + x_2 a_{2,c-1} + \cdots + x_{r-1} a_{r-1,c-1} \end{bmatrix}$$

FIG. 1
(Conventional Art)

$$B = \begin{pmatrix} 0 & 4 & 2 \\ 4 & 3 & 0 \end{pmatrix} \cdot \begin{pmatrix} 0 & 1 \\ 1 & 2 \\ 2 & 3 \end{pmatrix} = \begin{pmatrix} 0+4+4 & 0+8+6 \\ 0+3+0 & 4+6+0 \end{pmatrix} = \begin{pmatrix} 8 & 14 \\ 3 & 10 \end{pmatrix}$$

FIG. 2
(Conventional Art)

$$\begin{pmatrix} 0 & 4 & 1 & 0 & 9 & 2 & 0 & 0 \\ 6 & 3 & 0 & 0 & 3 & 0 & 0 & 0 \\ 0 & 0 & 0 & 0 & 0 & 2 & 0 & 0 \\ 4 & 3 & 0 & 0 & 1 & 0 & 4 & 0 \\ 0 & 4 & 2 & 0 & 4 & 0 & 0 & 0 \\ 4 & 3 & 0 & 0 & 0 & 0 & 5 & 0 \\ 0 & 7 & 0 & 0 & 0 & 0 & 0 & 4 \end{pmatrix}$$

FIG. 3
(Conventional Art)

Value Array

| 4 | 1 | 9 | 2 | 6 | 3 | 3 | 2 | 4 | 3 | 1 | 4 | 4 | 2 | 4 | 4 | 3 | 5 | 7 | 4 |

Column Indices Array

| 1 | 2 | 4 | 5 | 0 | 1 | 4 | 5 | 0 | 1 | 4 | 6 | 1 | 2 | 4 | 0 | 1 | 6 | 1 | 7 |

Row Pointer Array

| 0 | 4 | 7 | 8 | 12 | 15 | 18 | 20 |

FIG. 4
(Conventional Art)

ZERO SKIPPING TECHNIQUES FOR REDUCING DATA MOVEMENT

BACKGROUND OF THE INVENTION

Scalar, vector and matrix multiplications are common computations performed by computing devices. Scalar, vector and matrix multiplication operations are commonly used in machine learning, artificial intelligence, neural networks, data analytics and the like. For example, a number of applications compute vector and or matrix multiplication between an input or activation matrix and a weight vector or matrix. The computations can be performed hundreds, thousand or even more times.

Referring to FIG. 1, matrix-vector multiplication between a c×r matrix A and a column vector X of r rows comprises the dot product of X with each of the rows of A. The dot product can be computed by multiplying each element in the first row of matrix A with the corresponding element in the column of vector X and summing the partial products thereof, and repeating the process for each row of matrix A. Matrix-matrix multiplication can be considered as a plurality of matrix-vector multiplications. An exemplary matrix-matrix multiplication between a c×r matrix A and a r×c matrix X is illustrated in FIG. 2. It is also noted that matrix-matrix multiplication and matrix-vector multiplication are equivalent when one of the matrices is a single-row matrix (e.g., row vector) or single-column matrix (e.g., column vector).

Referring now to FIG. 3, an exemplary sparse matrix is illustrated. A sparse matrix is a matrix in which the majority of the element values are zero. In contrast, a matrix in which the majority of element values are non-zero is referred to as a dense matrix. A matrix can conventionally be stored as a two-dimensional array. Each entry in the array represents an element $a_{i,j}$ of the matrix and is accessed by the two indices i and j. For a m×n matrix, the amount of memory required to store the matrix is proportional to m×n. For sparse matrix, the amount of memory for storage can be reduced by only storing the non-zero element values. There are a number of data structures used for storing sparse matrices in a condensed format, including but not limited to, dictionary of keys, list of lists, coordinate list, compressed sparse row, compressed sparse column, and the like.

Referring now to FIG. 4, an exemplary compressed sparse row (CSR) data structure according to the conventional art is shown. The CSR data structure represent a sparse matrix with three arrays: a row pointer array, a column indices array and a value array. The value array includes the non-zero values. The column indices array indicates the column in which the non-zero values are located in a given row. The row pointer array indicates where non-zero values for the corresponding row start in the value array. Similarly, a compressed sparse column (CSC) data structure can represent a sparse matrix with a column pointer array, a row indices array and value array. Generally, compressed format matrix data structures, such as CSR and CSC, reduce the amount of storage consumed by the matrix. The compressed format matrix data structures, such as CSR or CSC, can also reduce the computational workload by eliminating computations involving zero value matrix elements. CSR and CSC techniques provides for improved performance when the sparsity ration is high due to compression and de-compression overhead. Other conventional sparsity techniques include Eyerisis and compressing direct memory access engines (DMA). In Eyerisis, the processing element is designed to skip zero inputs mainly to reduce power. Eyerisis can improve performance under compute bound cases, but will not benefit data movement from memory to processor/accelerator. In a compressing DMA engine, a mask is used for zero data, and decoding data before computation. A compressing DMA engine however only benefits data transmission, and requires de-compression before computing.

Most sparsity techniques are implemented on the processor or accelerator, and not on the memory subsystem. Most sparsity techniques utilize compression to make computation more efficient. The bandwidth of off-chip memory devices, such as volatile memory (e.g., DRAM) and non-volatile memory (e.g., FLASH) are not generally high enough to support high speed processors and accelerators, and therefore become performance bottlenecks. Accordingly, there is a continuing need for improved data transmission and computation techniques for use with sparse scalar, vector and matrix computations.

SUMMARY OF THE INVENTION

The present technology may best be understood by referring to the following description and accompanying drawings that are used to illustrate embodiments of the present technology directed toward zero skipping sparsity techniques for reducing data movement.

In one embodiment, a zero skipping sparsity computation system can include a processor and a memory. The processor can include a processor sparsity control unit and a command interface. The processor sparsity control unit can be configured to a wrap memory access request in a zero skipping sparsity command. The command interface of the processor can be configured to transmit the zero skipping sparsity command and receive given elements from a first set of elements and second set of elements. The processor can be configured to perform a computation operation on respective given elements of the first set of elements and the second set of elements to generate result elements. The command interface of the processor can be further configured to transmit the result elements. The memory can include a memory cell array, a command interface and a memory sparsity control unit. The command interface of the memory can be configured to receive the zero skipping sparsity command. The memory sparsity control unit can be configured to access a first set of elements in the memory cell array, determine zero and near-zero element values in the first set and generate a first zero element mask based on the determined zero and near-zero elements of the first set of elements. The memory sparsity control unit can also be configured to access a second set of elements in the memory cell array, determine zero and near-zero element values in the second set of elements and generate a second zero element mask based on the determined zero and near-zero elements of the second set of elements. The memory sparsity control unit can also be configured to generate a computation zero mask based on a computation operation of the zero skipping sparsity command, the first zero element mask and the second zero element mask. The memory sparsity control unit can also be configured to write zero values to the memory cell array based on the computation zero mask as a part of computation results. The command interface of the memory can be further configured to transmit given elements from the first and second sets of elements corresponding to non-zero indicators in the computation zero mask and receive result elements. The memory sparsity control unit can be further configured to write the result elements to the memory cell array as an additional part of computation results of the first and second sets of elements based on the computation zero mask.

In another embodiment, the processor can include a processor sparsity control unit configured to generate a first zero skipping sparsity command wrapping a memory access request. The processor can also include a command interface configured to transmit the first zero skipping sparsity command, receive a first zero element mask and given elements from a first set of elements, and receive a second zero element mask and given elements from a second set of elements. The processor sparsity control unit of the processor can further be configured to generate a first computation zero mask based on a computation operation of the first zero skipping sparsity command, the first zero element mask and the second zero element mask. The processor can be configured to perform the computation operation on respective given elements of the first set of elements and the second set of elements to generate first result elements. The command interface of the processor can further be configured to transmit the first result elements. The memory can include can a memory cell array, a command interface, and a memory sparsity control unit. The command interface of the memory can be configured to receive the first zero skipping sparsity command. The memory sparsity control unit can be configured to access the first set of elements in the memory cell array, determine zero and near-zero element values in the first set and generate a first zero element mask based on the determined zero and near-zero elements of the first set of elements. The memory sparsity control unit can also be configured to access the second set of elements in the memory cell array, determine zero and near-zero element values in the second set of elements and generate a second zero element mask based on the determined zero and near-zero elements of the second set of elements. The command interface of the memory can be further configured to transmit given elements from the first set of elements corresponding to non-zero indicators in the first zero element mask, transmit the first zero element mask, transmit given elements from the second set of elements corresponding to non-zero indicators in the second zero element mask, transmit the second zero element mask, and receive the first result elements. The memory sparsity control unit can further be configured to write the first result elements as computation results of the first and second sets of elements to the memory cell array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 1 illustrates matrix-vector multiplication according to the conventional art.

FIG. 2 shows an exemplary matrix-matrix multiplication according to the conventional art.

FIG. 3 shows an exemplary sparse matrix according to the conventional art.

FIG. 4 shows an exemplary compressed sparse row (CSR) data structure according to the conventional art.

DETAILED DESCRIPTION OF THE INVENTION

Figure 5:
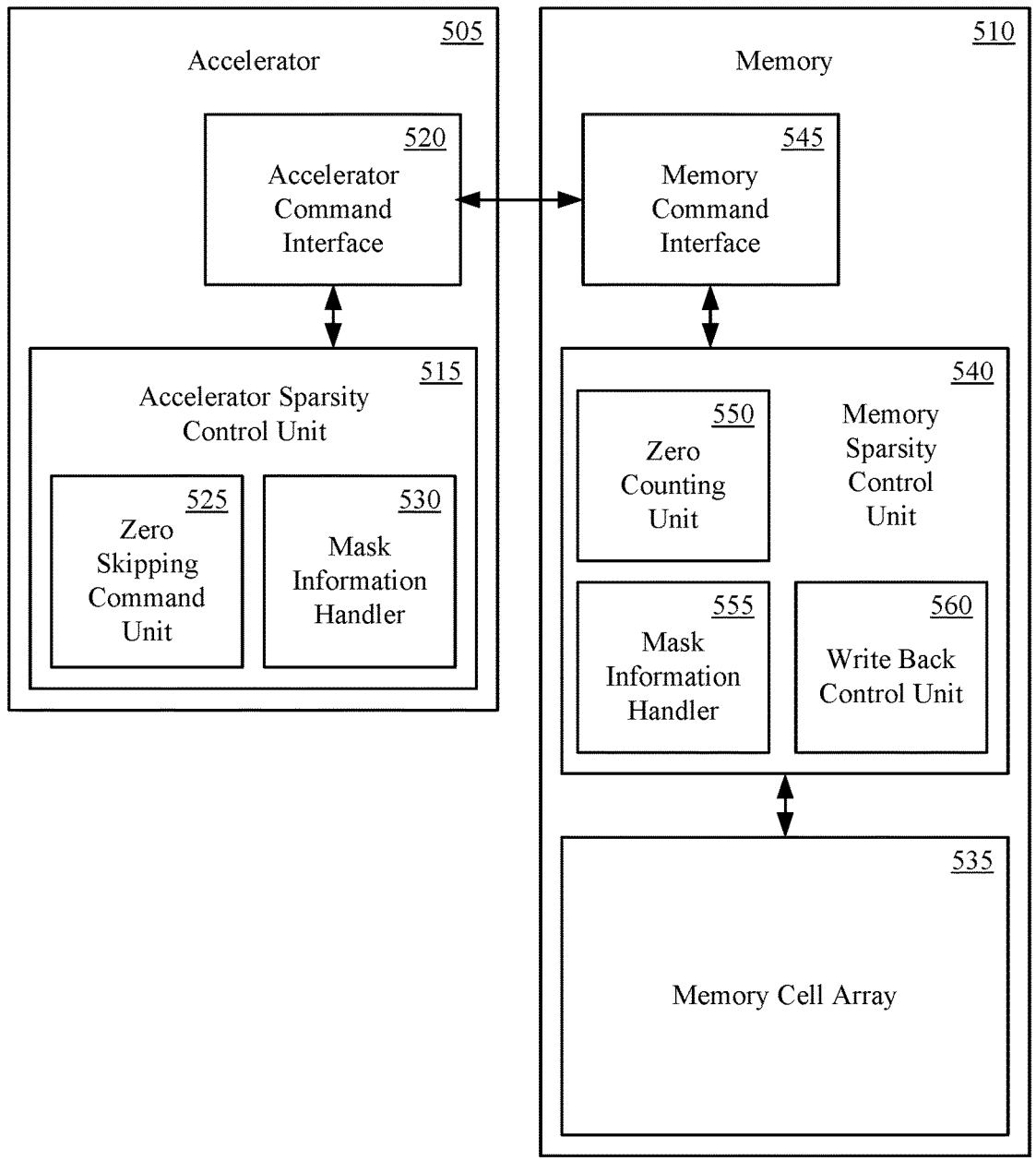
FIG. 5 shows a computing system, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring now to FIG. 5, a computing system, in accordance with aspects of the present technology, is shown. The computing system 500 can include one or more accelerators 505 and one or more memories 510. The computing system 500 can include numerous other subsystems that are not necessary for an understanding of aspects of the present technology and therefore are not described herein. The one or more accelerators 505 can be, but are not limited to, central processing units (CPUs) or graphics processing units (GPUs). The one or more memories 510 can be, but are not limited to, volatile memory such as dynamic random-access memory (DRAM), or non-volatile memory (NVM) such as static random-access memory (SRAM), flash memory or the like. For easy of description, aspects of the present technology will be described hereinafter with regard to one accelerator 505 and one memory 510. However, a computing system 500 can include any combination of one or more accelerators 505 and one or more memories 510.

Figure 6A:
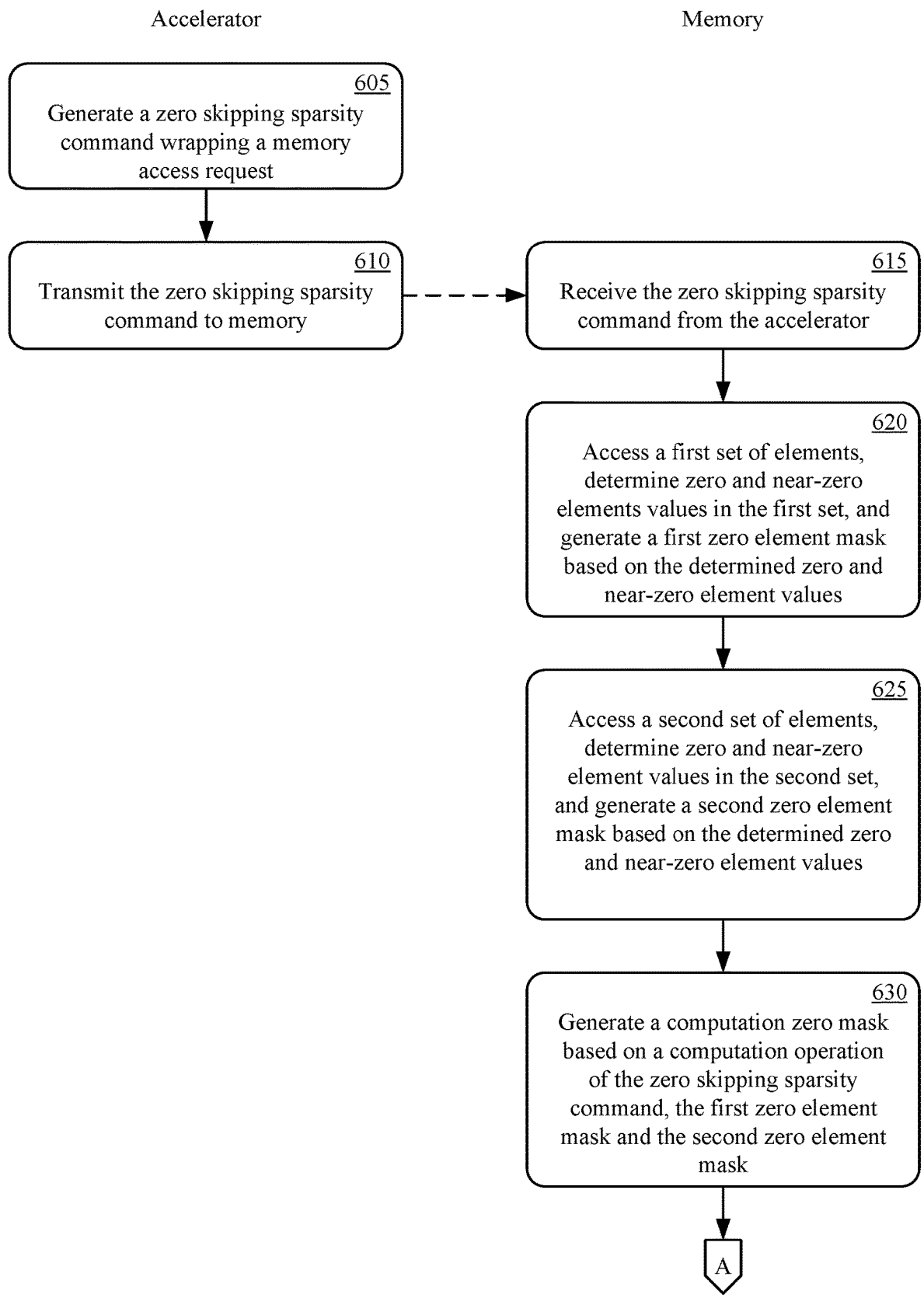
FIGS. 6A-6B show a zero skipping sparsity computation method, in accordance with aspects of the present technology.
Figure 6B:
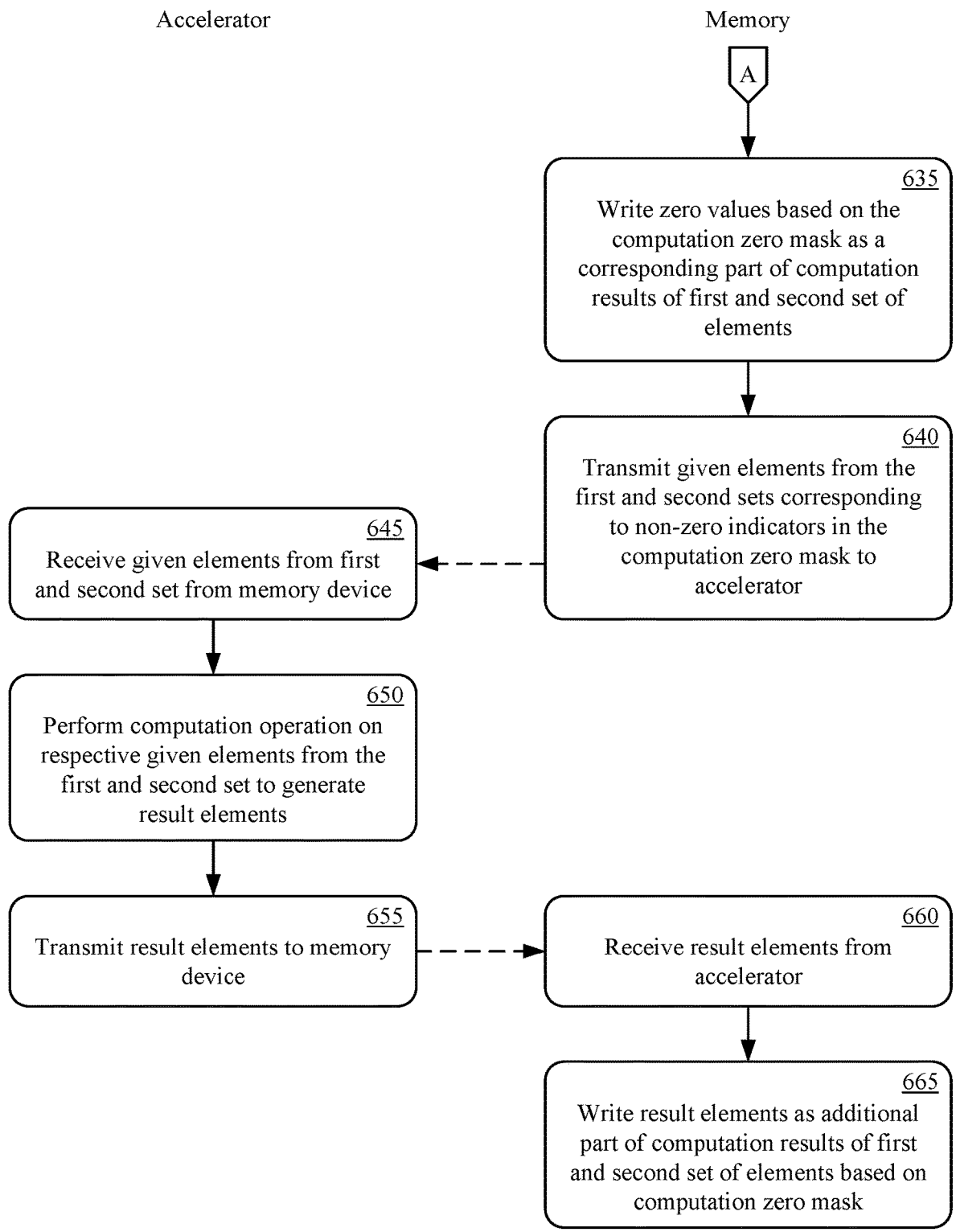
Figure 7A:
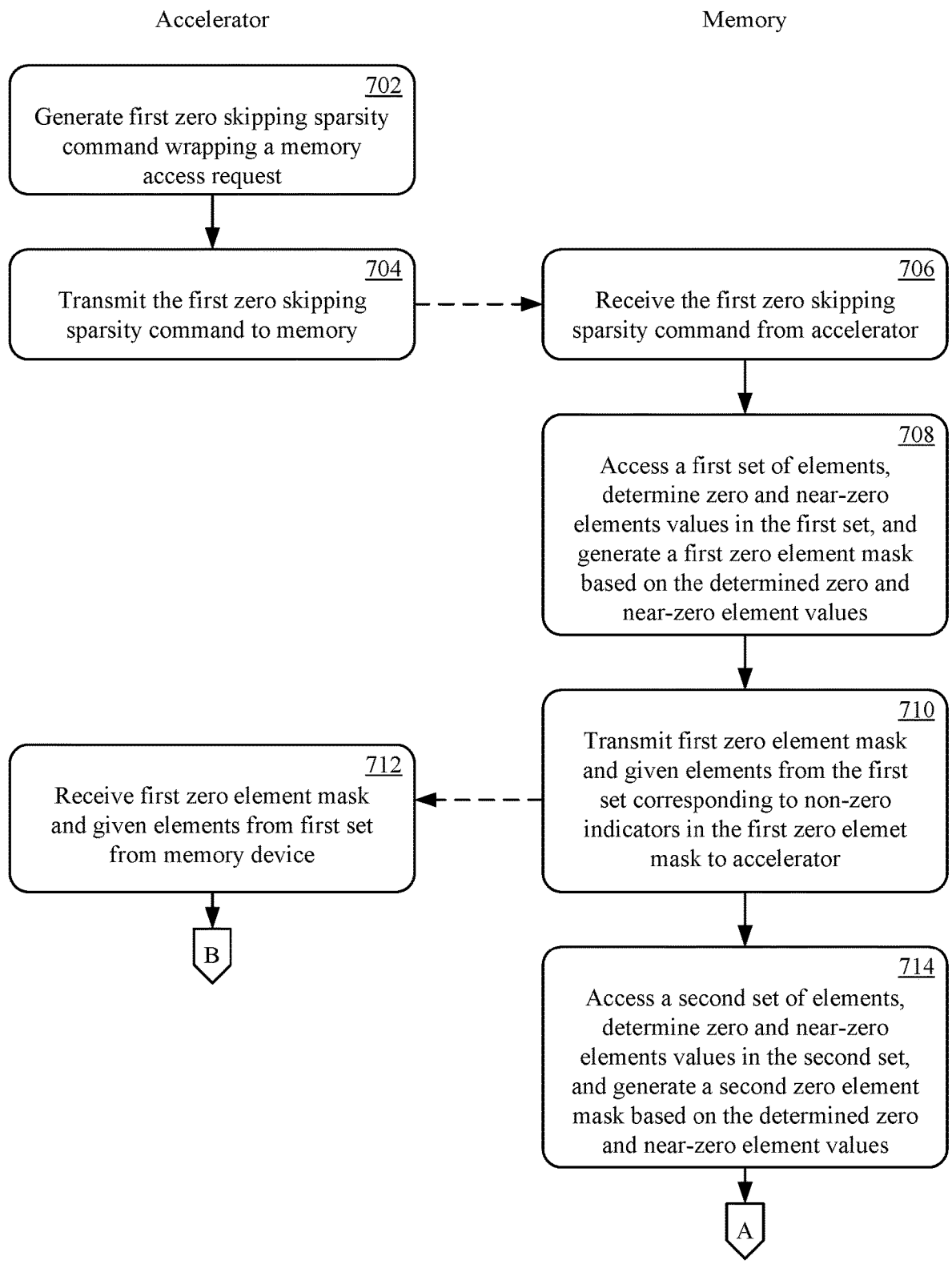
FIGS. 7A-7D show a zero skipping sparsity computation method, in accordance with aspects of the present technology.
Figure 7B:
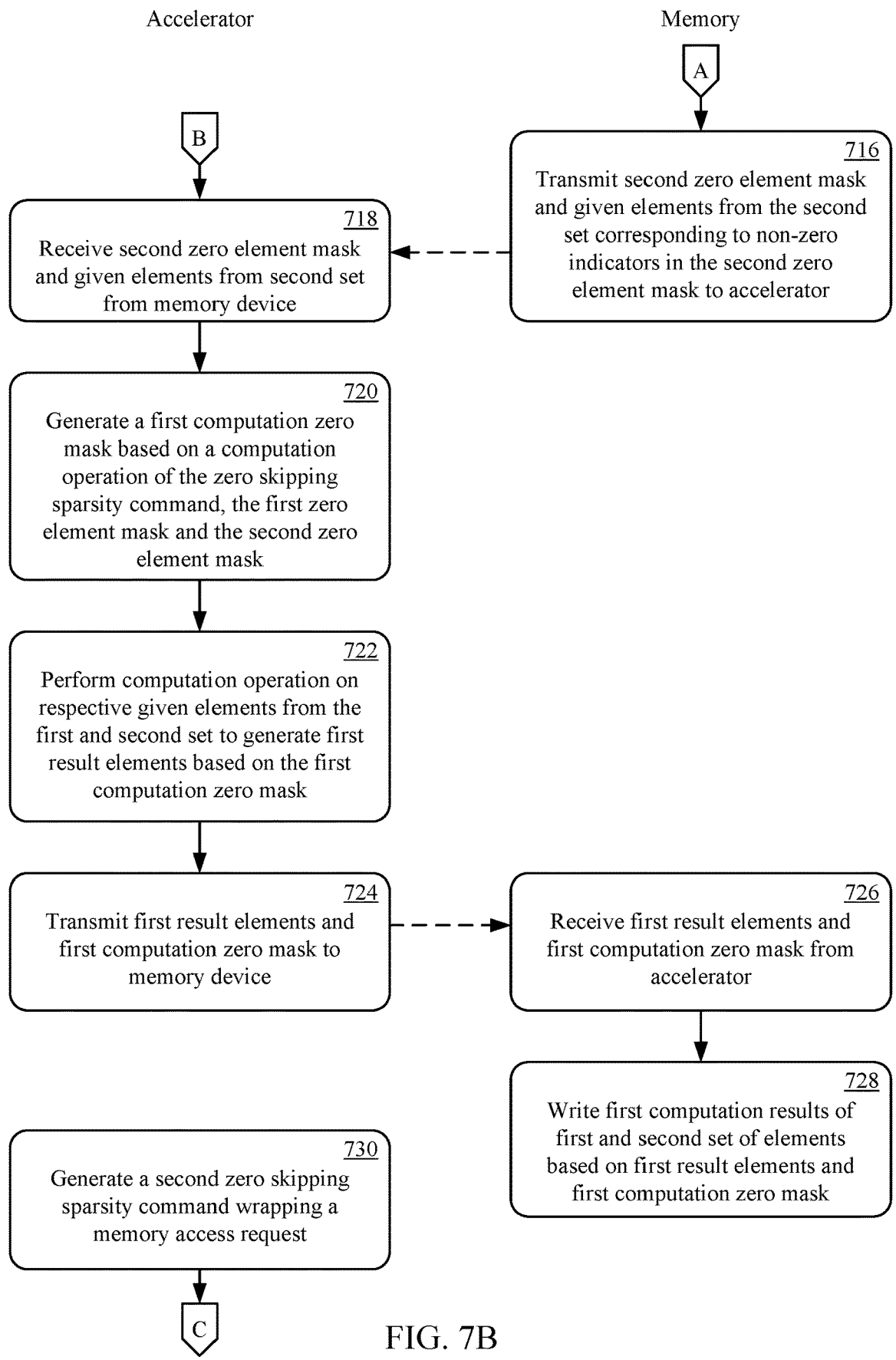
Figure 7C:
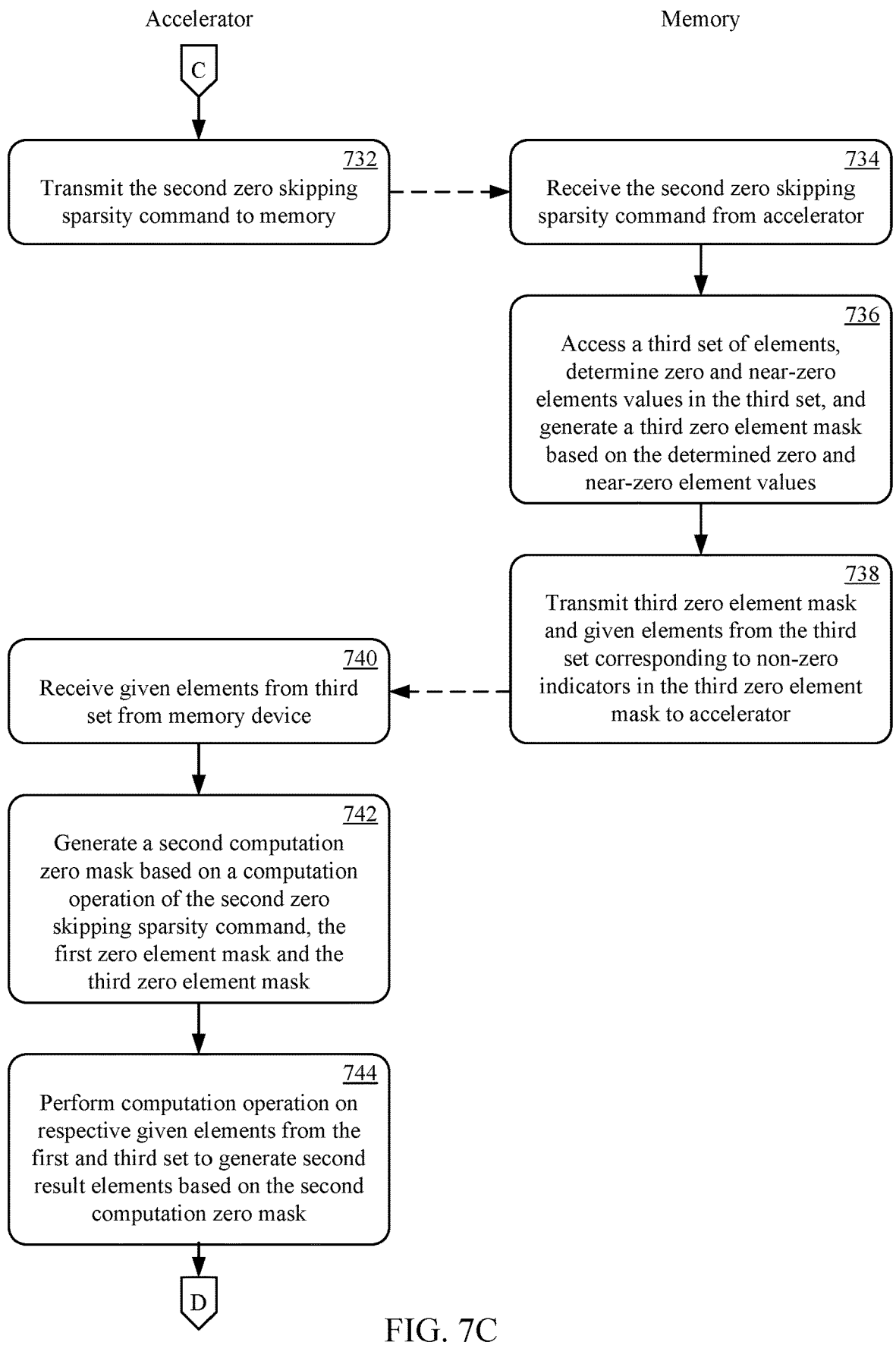
Figure 7D:
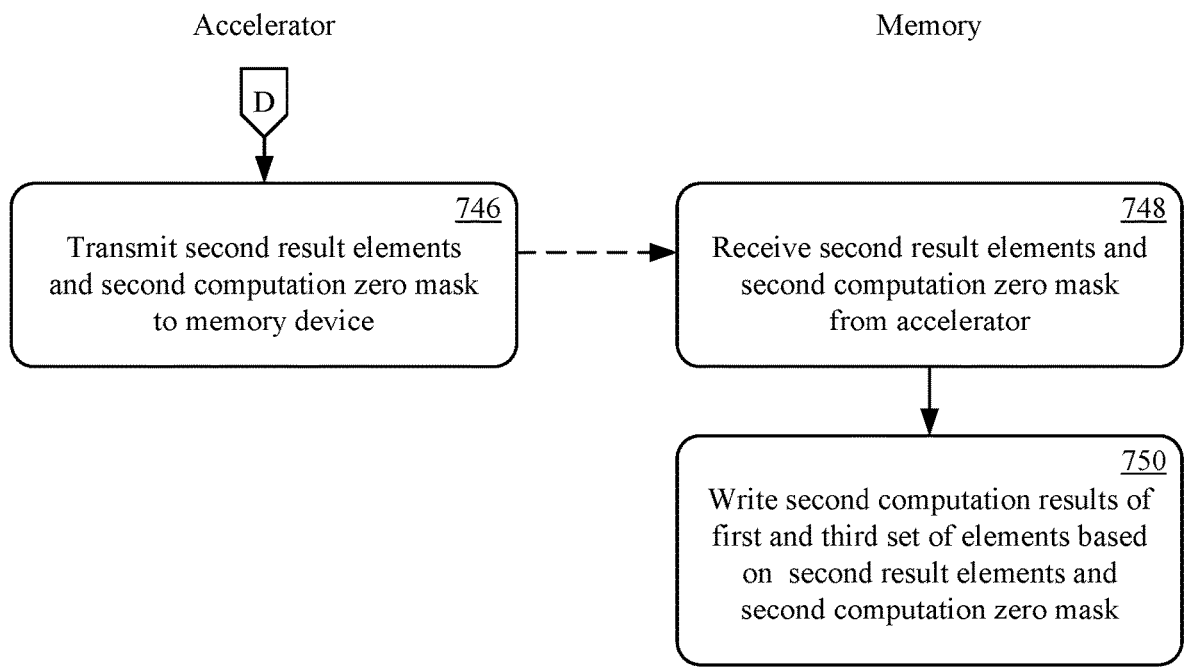

The accelerator 505 can include an accelerator sparsity control unit 515 and an accelerator command interface 520. The accelerator 505 can include numerous other subsystems that are not necessary for an understanding of aspects of the present technology and therefore are not described herein. The accelerator sparsity control unit 515 can include a zero skipping command unit 525 and optionally a mask information handler 530. The memory 510 can include a memory cell array 535, a memory sparsity control unit 540, and a memory command interface 545. In one implementation, the memory sparsity control unit can be part of a memory controller (MC) integral to the memory 510. In another implementation, the memory sparsity control unit can be part of a separate memory controller (MC) coupled to one or more memory subsystems. The memory 510 can include numerous other subsystems that are not necessary for an understanding of aspects of the present technology and therefore are not described herein. The memory sparsity control unit 540 can include a zero counting unit 550, a mask information handler 555 and a write back control unit 560. The sparsity control units 515, 540 and command interfaces 520, 545 of the accelerator 505 and memory 510 can be configured to implement zero skipping sparsity computations as will be described further with reference to FIGS. 6A and 6B.

The zero skipping sparsity computation can include generating a zero skipping sparsity command wrapping a memory access request, at 605. The zero skipping sparsity command can be generated by the accelerator 505. In one implementation, the accelerator sparsity control unit 515 can be configured to wrap a memory access request in a zero skipping sparsity command. In one implementation, the zero skipping command unit 525 of the accelerator sparsity control unit 515 can be configured to generate the zero skipping sparsity command including a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length). The first set of elements can be values of a first scalar, vector, matrix or the like. The second set of elements can be values of a second scalar, vector, matrix or the like. The computation operation code (OP) can be an operation code specifying addition, subtraction, multiplication, division or the like computation using the first and second set of elements. In one implementation, the zero skipping sparsity command can further include a near-zero threshold (NZ_Th) value. In another implementation, the near-zero threshold value can be provided to the memory in a separate initialization process. At 610, the zero skipping sparsity command can be transmitted from the accelerator 505. In one implementation, the accelerator command interface 520) can transmit the zero skipping sparsity command, generated by the accelerator sparsity control unit 515, to the memory 510.

At 615, the zero skipping sparsity command can be received by the memory 510. In one implementation, the memory command interface 545 can receive the zero skipping sparsity command from the accelerator 505. At 620, a first set of elements can be accessed to determine zero and near-zero elements values in the first set, and generate a first zero element mask based on the determined zero and near-zero element values. In one implementation, the memory sparsity control unit 540 can be configured to access the first set of elements stored in the memory cell array 535 as specified by the address of the first set of elements (Addr1) and the data length (length) in the zero skipping sparsity command. The zero counting unit 550) can be configured to determine zero element values and near-zero element values in the first set of elements. For example, the zero counting unit 550) can determine that element values in the first set of elements are near-zero element values when less than a specified near-zero threshold (NZ_Th). Again, the near-zero threshold (NZ_Th) can be included in the zero skipping sparsity command or provided in a separate initialization process. The zero counting unit 550 can also utilize the data type (DataType) in the zero skipping sparsity command for determining zero and near-zero element values. For example, if the element values are encoded as integer or fixed-point format, the leading zeros in the integer part can be counted to determine if the given element value is a near-zero value. If the element values are encoded in a floating-point format, the leading zeros in the exponent field can be counted to determine if the given element value is a near-zero value. The mask information handler 555 can generate the first zero element mask wherein zero and near-zero element values are indicated by a first state (e.g., '0' bit value) and non-zero element values are indicated by a second state (e.g., '1' bit value).

At 625, a second set of elements can be accessed to determine zero and near-zero elements values in the second set, and generate a second zero element mask based on the determined zero and near-zero element values. In one implementation, the memory sparsity control unit 540) can be configured to access the second set of elements stored in the memory cell array 535 as specified by the address of the second set of elements (Addr2) and the data length (length) in the zero skipping sparsity command. The zero counting unit 550) can be configured to determine zero element values and near-zero element values in the second set of elements. For example, the zero counting unit 550) can determine that values in the second set of elements are near-zero element values when less than a specified near-zero threshold (NZ_Th). Again, the near-zero threshold (NZ_Th) can be included in the zero skipping sparsity command or provided in a separate initialization process. The zero counting unit 550) can also utilize the data type (DataType) in the zero skipping sparsity command for determining zero and near-zero element values. The mask information handler 555 can generate the second zero element mask wherein zero and near-zero element values are indicated by a first state (e.g., '0' bit value) and non-zero values are indicated by a second state (e.g., '1' bit value).

At 630, a computation zero element mask can be generated based on a computation operation of the zero skipping sparsity command, the first zero element mask and the second zero element mask. In one implementation, mask information handler 555 can generate the computation zero element mask including a set of indicators wherein zero and near-zero element values are indicated by a first state (e.g., '0' bit value) and non-zero element values are indicated by a second state (e.g., '1' bit value) based on the computation operation code (OP) of the zero skipping sparsity command and the respective states of the first and second zero element masks. For example, if either or both respective indicators of the first and second zero element masks are in a first state (e.g., '0') for a multiplication computation, the corresponding indicator of the computation zero mask can be set to the first state (e.g., '0'). However, if both respective indicators in the first and second zero element masks are in a second state (e.g., '1') for the multiplication computation, the corresponding indicator of the computation zero mask can be set to the second state (e.g., '1'). In another example, if both respective indicators of the first and second zero element mask are in the first state (e.g., '0') for an addition computation, the corresponding indicator of the computation zero mask can be set to the first state (e.g., '0'). However, if one or the other or both respective indicators of the first and second zero element mask are in the second state (e.g., '1') for the addition computation, the corresponding indicator of the computation zero mask can be set to the second state (e.g., '1').

At 635, zero values based on the computation zero mask can be written back as a corresponding part of a computation result of the first and second set of elements. In one implementation, the write back control unit 560 can be configured to write back zero values to the corresponding element locations at the destination address (Addrdst) specified in the zero skipping sparsity command for any indicators in the computation zero mask that are set to the first state (e.g., '0').

At 640, the memory 510 can transmit given elements from the first and second sets corresponding to non-zero indicators in the computation zero mask. In one implementation, the memory command interface 545 can transmit the given elements from the first and second sets, corresponding to indicators in the computation zero mask set to the second state, to the accelerator 505. The memory command interface 545 can optionally transmit the zero skipping command identifier (TAGID) from the zero skipping sparsity command along with the given elements. The zero skipping command identifier (TAGID) can identify the given zero skipping sparsity command that the given elements are associated with.

At 645, the accelerator 505 can receive given elements of the first and second sets from the memory 510 in response to the zero skipping sparsity command. In one implementation, given elements from the first and second sets can be received by the accelerator command interface 520 from the memory command interface 545. The zero skipping command identifier (TAGID) can also be received by the accelerator command interface 520 along with the given elements. Again, the zero skipping command identifier (TAGID) can be utilized to identify the given zero skipping sparsity command that the given elements are associated with. At 650, a computation operation can be performed on the respective given elements from the first and second sets to generate result elements. In one implementation, the accelerator 505 can perform the computation operation specified by the computation operation code (OP) of the zero skipping sparsity command on the received given elements of the first and second sets. At 655, the result elements can be transmitted by the accelerator 505. In one implementation, the accelerator command interface 520 can transmit the result elements for the zero skipping sparsity command to the memory 510. The accelerator command interface 520 can optionally transmit the zero skipping command identifier (TAGID) from the zero skipping sparsity command along with the result elements. Again, the zero skipping command identifier (TAGID) can be utilized to identify the given zero skipping sparsity command that the given result elements are associated with.

At 660, the memory 510 can receive the result elements for the zero skipping sparsity command. In one implementation, the memory command interface 545 can receive the result element from the accelerator command interface 520. The memory command interface 545 can optionally receive the zero skipping command identifier (TAGID) from the zero skipping sparsity command along with the result elements. Again, the zero skipping command identifier (TAGID) can be utilized to identify the given zero skipping sparsity command that the given result elements are associated with. At 665, computation results of the first and second set of elements can be written to the memory 510 based on the received result elements and the computation zero mask. In one implementation, the write back control unit 560 can be configured to write back the received result elements as the additional part of the computation results of the first and second set of elements based on the computation zero mask, to the memory cell array 535 at the destination address (Addrdst). It is to be appreciated that the processes at 605-666 can be iteratively repeated for each of a plurality of zero skipping sparsity commands. Furthermore, the accelerator sparsity control unit and memory sparsity control unit can be configurable to be enabled and disabled to selective perform zero skipping sparsity computations as appropriate.

Referring now to Table 1, an exemplary zero skipping sparsity computation, in accordance with aspects of the present technology, is illustrated. The exemplary zero skipping sparsity computation can be a vector-vector multiplication of N-element first and second vectors (Vector 1 and Vector 2). Although the element values in Table 1 are listed as decimal numbers for easy of understanding, it is to be appreciated that the values are typically encoded as binary numbers.

TABLE 1

|  | 0 | 1 | 2 | 3 | 4 | 5 | ... | N-1 | N |
|---|---|---|---|---|---|---|---|---|---|
| Vector1 | 5E-04 | 800.2 | 3.65 | 0.001 | 10.5 | 1E-08 | ... | 56.3 | 2E-05 |
| Mask1 | 0 | 1 | 1 | 0 | 1 | 0 | ... | 1 | 0 |
| Vector2 | 9556 | 0.01 | 62.3 | 7E-04 | 9E-04 | 1.35 | ... | 8.52 | 0.005 |
| Mask2 | 1 | 0 | 1 | 0 | 0 | 1 | ... | 1 | 0 |
| Comp Mask | 0 | 0 | 1 | 0 | 0 | 0 | ... | 1 | 0 |
| Vector1 Given Elements |  |  | 3.65 |  |  |  |  | 56.3 |  |
| Vector2 Given Elements |  |  | 62.3 |  |  |  |  | 8.52 |  |
| Result Elements |  |  | 227.4 |  |  |  |  | 479.7 |  |

As described above, first and second masks (Mask1 and Mask2) can be generated based on the zero and near-zero element values in the first and second vectors (Vector1 and Vector2) respectively. For example, if near-zero threshold (NZ_Th) value is set to 0.1, the floating-point value of the first element of the first vector can be determined to be near-zero and the corresponding identifiers in the first mask (Mask1) can be set to 0. Similarly, the element valued of 0.001, 1E-08 and 2E-05 can be determined to be near-zero and the corresponding identifiers in the first mask (Mask1) can also be set to 0. In addition, the corresponding identifiers for the non-zero elements can be set to 1. The zero and near-zero elements values of the second vector (Vector2) can be determined and the corresponding identifiers in the second mask (Mask2) can be similarly set. The computation zero mask for multiplication can be generated by setting the corresponding indicators in the computation zero mask to 0 if either or both the corresponding indicators in the first and second mask (Mask1 and Mask2) are zero. If both corresponding indicators in the first and second mask (Mask1 and Mask2) are set to 1, the corresponding indicator in the computation zero mask can be set to 1. As illustrated, the indicators in the computation zero mask are set to 1 for the third and N−1th elements. Accordingly, the given elements 3.65 and 56.3 of the first vector (Vector1) and the given elements 62.3 and 8.52 of the second vector (Vector2) can be sent from the memory to the accelerator for multiplication of the respective given elements to generate the result elements 227.4 and 479.7. The result elements can be sent from the accelerator to the memory for storage as the additional part of the computation results.

Referring now to Table 2, another exemplary zero skipping sparsity computation, in accordance with aspects of the present technology, is illustrated. The exemplary zero skipping sparsity computation can be a vector-vector addition.

TABLE 2

|  | 0 | 1 | 2 | 3 | 4 | 5 | ... | N-1 | N |
|---|---|---|---|---|---|---|---|---|---|
| Vector1 | 5E-04 | 800.2 | 3.65 | 0.001 | 10.5 | 1E-08 | ... | 56.3 | 2E-05 |
| Mask1 | 0 | 1 | 1 | 0 | 1 | 0 | ... | 1 | 0 |
| Vector2 | 9556 | 0.01 | 62.3 | 7E-04 | 9E-04 | 1.35 | ... | 8.52 | 0.005 |
| Mask2 | 1 | 0 | 1 | 0 | 0 | 1 | ... | 1 | 0 |
| Comp Mask | 1 | 1 | 1 | 0 | 1 | 1 | ... | 1 | 0 |
| Vector1 Given Elements | 5E-04 | 800.2 | 3.65 |  | 10.5 | 1E-08 |  | 5.63 |  |
| Vector2 Given Elements | 9556 | 0.01 | 62.3 |  | 9E-04 | 1.35 |  | 8.52 |  |
| Result Elements | 9556 | 800.2 | 65.95 |  | 10.4 | 1.38 |  | 14.15 |  |

For addition, the computation zero mask can be generated by setting the corresponding indicators in the computation zero mask to 0 if both the corresponding indicators in the first and second mask (Mask1 and Mask2) are zero. If either or both corresponding indicators in the first and second mask (Mask1 and Mask2) are set to 1, the corresponding indicator in the computation zero mask can be set to 1.

Aspects of the present technology can advantageously reduce bandwidth utilization of the interface between the accelerator 205 and memory 210. Depending upon the sparsity of one of the sets of elements, the bandwidth utilization can be decreased proportional to the level of sparsity. For example, if a set of elements is characterized by a sparsity of 50% (e.g., half of the elements are zero or near-zero values), the bandwidth utilization of the interface between the accelerator 205 and memory 210 can be reduced by approximately 50%. Similar, reduction in the computation workload on the processor can also be achieved.

Referring now to FIGS. 7A-7D, a zero skipping sparsity computation method, in accordance with aspects of present technology, is shown. The zero skipping sparsity computation can include generating a first zero skipping sparsity command wrapping a memory access request, at 702. The zero skipping sparsity command can be generated by the accelerator 505. In one implementation, the accelerator sparsity control unit 515 can be configured to wrap a memory access request in a first zero skipping sparsity command. In one implementation, the zero skipping command unit 525 of the accelerator sparsity control unit 515 can be configured to generate the first zero skipping sparsity command including a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length). The first set of elements can be values of a first scalar, vector, matrix or the like. For example, the first set of elements can be a weight vector, matrix or the like. The second set of elements can be values of a second scalar, vector, matrix or the like. For example, the second set of elements can be a feature map vector, matrix or the like. The computation operation code (OP) can be an operation code specifying addition, subtraction, multiplication, division or the like computation using the first and second set of elements. In one implementation, the zero skipping sparsity command can further include a near-zero threshold (NZ_Th) value. In another implementation, the near-zero threshold value can be provided to the memory in a separate initialization process. At 704, the first zero skipping sparsity command can be transmitted from the accelerator 505. In one implementation, the accelerator command interface 520 can transmit the first zero skipping sparsity command, generated by the accelerator sparsity control unit 515, to the memory 510.

At 706, the first zero skipping sparsity command can be received by the memory 510. In one implementation, the memory command interface 545 can receive the first zero skipping sparsity command from the accelerator 505. At 708, a first set of elements can be accessed to determine zero and near-zero elements values in the first set and generate a first zero element mask based on the determined zero and near-zero element values. In one implementation, the memory sparsity control unit 540 can be configured to access the first set of elements stored in the memory cell array 535 as specified by the address of the first set of elements (Addr1) and the data length (length) in the first zero skipping sparsity command. The zero counting unit 550 can be configured to determine zero values and near-zero values in the first set of elements. For example, the zero counting unit 550) can determine that values in the first set of elements are near-zero values when less than a specified near-zero threshold (NZ_Th). Again, the near-zero threshold (NZ_Th) can be included in the zero skipping sparsity command or provided in a separate initialization process. The zero counting unit 550 can also utilize the data type (DataType) in the zero skipping sparsity command for determining zero and near-zero values. For example, if the element values are encoded as integer or fixed-point format, the leading zeros in the integer part can be counted to determine if the given element value is a near-zero value. If the element values are encoded in a floating-point format, the leading zeros in the exponent field can be counted to determine if the given element value is a near-zero value. The mask information handler 555 can generate the first zero element mask wherein zero and near-zero element values are indicated by a first state (e.g., '0' bit value) and non-zero values are indicated by a second state (e.g., '1' bit value).

At 710, the first zero element mask and given elements from the first set corresponding to non-zero indicators in the first zero element mask can be transmitted from the memory 510. In one implementation, the memory command interface 545 can transmit the first zero element mask and given elements to the accelerator 505. At 712, the first zero mask and given elements can be received by the accelerator 505. In one implementation, the accelerator command interface 520 can receive the first zero mask and given elements from the first set corresponding to non-zero indicators in the first zero mask from the memory 510.

At 714, a second set of elements can be accessed to determine zero and near-zero elements values in the second set and generate a second zero element mask based on the determined zero and near-zero element values. In one implementation, the memory sparsity control unit 540 can be configured to access the second set of elements stored in the memory cell array 535 as specified by the address of the second set of elements (Addr2) and the data length (length) in the first zero skipping sparsity command. The zero counting unit 550 can be configured to determine zero values and near-zero values in the second set of elements. For example, the zero counting unit 550 can determine that values in the second set of elements are near-zero values when less than a specified near-zero threshold (NZ_Th). Again, the near-zero threshold (NZ_Th) can be included in the zero skipping sparsity command or provided in a separate initialization process. The zero counting unit 550 can also utilize the data type (DataType) in the zero skipping sparsity command for determining zero and near-zero values. The mask information handler 555 can generate the second zero element mask wherein zero and near-zero element values are indicated by a first state (e.g., '0' bit value) and non-zero values are indicated by a second state (e.g., '1' bit value). At 716, the second zero element mask and given elements from the second set corresponding to non-zero indicators in the second zero element mask can be transmitted from the memory 510. In one implementation, the memory command interface 545 can transmit the second zero element mask and given elements to the accelerator 505.

At 718, the second zero element mask and given elements can be received by the accelerator 505. In one implementation, the accelerator command interface 520 can receive the second zero element mask and given elements from the second set corresponding to non-zero indicators in the second zero element mask from the memory 510. At 720, a first computation zero mask can be generated based on a computation operation of the first zero skipping sparsity command, the first zero element mask and the second zero element mask. In one implementation, mask information handler 530 of the accelerator 505 can generate the first computation zero element mask including a set of indicators wherein zero and near-zero element values are indicated by a first state (e.g., '0' bit value) and non-zero values are indicated by a second state (e.g., '1' bit value) based on the computation operation code (OP) of the first zero skipping sparsity command and the respective states of the first and second zero element masks. For example, if either or both respective indicators of the first and second zero element masks are in a first state (e.g., '0') for a multiplication computation, the corresponding indicator of the first computation zero mask can be set to the first state (e.g., '0'). However, if both respective indicators in the first and second zero element masks are in a second state (e.g., '1') for the multiplication computation, the corresponding indicator of the first computation zero mask can be set to the second state (e.g., '1'). In another example, if both respective indicators of the first and second zero element mask are in the first state (e.g., '0') for an addition computation, the corresponding indicator of the first computation zero mask can be set to the first state (e.g., '0'). However, if one or the other or both respective indicators of the first and second zero element mask are in the second state (e.g., '1') for the addition computation, the corresponding indicator of the first computation zero mask can be set to the second state (e.g., '1').

At 722, a computation operation can be performed on the respective given elements from the first and second sets to generate first result elements. In one implementation, the accelerator 505 can perform the computation operation specified by the computation operation code (OP) of the first zero skipping sparsity command on the received given elements of the first and second sets. At 724, the first result elements and first computation zero mask can be transmitted by the accelerator 505. In one implementation, the accelerator command interface 520 can transmit the first result elements and first computation zero mask for the zero skipping sparsity command to the memory 510. The accelerator command interface 520 can optionally transmit the zero skipping command identifier (TAGID) from the first zero skipping sparsity command along with the result elements. Again, the zero skipping command identifier (TAGID) can be utilized to identify the given zero skipping sparsity command that the given result elements are associated with.

At 726, the memory 510 can receive the first result elements and first computation zero mask for the first zero skipping sparsity command. In one implementation, the memory command interface 545 can receive the first result element and first computation zero mask from the accelerator command interface 520. The memory command interface 545 can optionally receive the zero skipping command identifier (TAGID) from the first zero skipping sparsity command along with the first result elements. Again, the zero skipping command identifier (TAGID) can be utilized to identify the given zero skipping sparsity command that the given result elements are associated with. At 728, first computation results of the first and second set of elements can be written to the memory 510 based on the received first result elements and the first computation zero element mask. In one implementation, the write back control unit 560 can be configured to write back the first received result elements along with applicable zero values as the computation results of the first and second set of elements based on the first computation zero mask, to the memory cell array 535 at the destination address (Addrdst).

At 730, a second zero skipping sparsity command wrapping a memory access request can be generated. In one implementation, the accelerator sparsity control unit 515 can be configured to wrap a memory access request in a second zero skipping sparsity command. In one implementation, the zero skipping command unit 525 of the accelerator sparsity control unit 515 can be configured to generate the second zero skipping sparsity command including a zero skipping command identifier (TAGID), a computation operation code (OP), a data type of third set of elements (DataType), an address of a third set of elements (Addr3), a second destination address for the result of the computation (Addrdst), and a data length (length). The third set of elements can be values of a first scalar, vector, matrix or the like. For example, the third set of elements can be another feature map vector, matrix or the like. The computation operation code (OP) can be an operation code specifying addition, subtraction, multiplication, division or the like computation using the third set of elements. In one implementation, the zero skipping sparsity command can further include the near-zero threshold (NZ_Th) value. In another implementation, the near-zero threshold value can be provided to the memory in a separate initialization process. At 732, the second zero skipping sparsity command can be transmitted from the accelerator 505. In one implementation, the accelerator command interface 520 can transmit the second zero skipping sparsity command, generated by the accelerator sparsity control unit 515, to the memory 510.

At 734 the second zero skipping sparsity command can be received by the memory 510. In one implementation, the memory command interface 545 can receive the second zero skipping sparsity command from the accelerator 505. At 736, a third set of elements can be accessed to determine zero and near-zero elements values in the third set and generate a third zero element mask based on the determined zero and near-zero element values. In one implementation, the memory sparsity control unit 540 can be configured to access the third set of elements stored in the memory cell array 535 as specified by the address of the first set of elements (Addr3) and the data length (length) in the second zero skipping sparsity command. The zero counting unit 550 can be configured to determine zero values and near-zero values in the third set of elements. For example, the zero counting unit 550) can determine that values in the third set of elements are near-zero values when less than a specified near-zero threshold (NZ_Th). Again, the near-zero threshold (NZ_Th) can be included in the first and/or second zero skipping sparsity command or provided in a separate initialization process. The zero counting unit 550 can also utilize the data type (DataType) in the first and/or second zero skipping sparsity command for determining zero and near-zero values. For example, if the element values are encoded as integer or fixed-point format, the leading zeros in the integer part can be counted to determine if the given element value is a near-zero value. If the element values are encoded in a floating-point format, the leading zeros in the exponent field can be counted to determine if the given element value is a near-zero value. The mask information handler 555 can generate the third zero element mask wherein zero and near-zero element values are indicated by a first state (e.g., '0' bit value) and non-zero values are indicated by a second state (e.g., '1' bit value). At 738, the third zero element mask and given elements from the third set of elements corresponding to non-zero indicators in the third zero element mask can be transmitted from the memory 510. In one implementation, the memory command interface 545 can transmit the third zero element mask and given elements to the accelerator 505.

At 740, the third zero mask and given elements can be received by the accelerator 505. In one implementation, the accelerator command interface 520 can receive the third zero element mask and given elements from the third set corresponding to non-zero indicators in the third zero element mask from the memory 510. At 742, a second computation zero mask can be generated based on a computation operation of the second zero skipping sparsity command, the first zero element mask and the third zero element mask. At 744, a computation operation can be performed on the respective given elements from the first and third sets to generate second result elements. In one implementation, the accelerator 505 can perform the computation operation specified by the computation operation code (OP) of the first or second zero skipping sparsity command on the received given elements of the first and third sets. For example, a vector multiplication can be performed between the weights of the first set of elements and a feature map of the third set of elements. At 746, the second result elements and second computation zero mask can be transmitted by the accelerator 505. In one implementation, the accelerator command interface 520 can transmit the second result elements and second computation zero mask for the zero skipping sparsity command to the memory 510. The accelerator command interface 520 can optionally transmit the zero skipping command identifier (TAGID) from the first zero skipping sparsity command along with the result elements. Again, the zero skipping command identifier (TAGID) can be utilized to identify the given zero skipping sparsity command that the given result elements are associated with.

At 748, the memory 510 can receive the second result elements and second computation zero mask for the second zero skipping sparsity command. In one implementation, the memory command interface 545 can receive the second result element and second computation zero mask from the accelerator command interface 520. The memory command interface 545 can optionally receive the zero skipping command identifier (TAGID) from the second zero skipping sparsity command along with the second result elements. Again, the zero skipping command identifier (TAGID) can be utilized to identify the given zero skipping sparsity command that the given result elements are associated with. At 750, the second computation results of the first and third set of elements can be written to the memory 510 based on the received second result elements and the second computation zero mask. In one implementation, the write back control unit 560 can be configured to write back the second received result elements along with applicable zero values as the computation results of the first and third set of elements based on the second computation zero mask, to the memory cell array 535 at the second destination address (Addrdst).

Referring now to Table 3, another exemplary zero skipping sparsity computation, in accordance with aspects of the present technology, is illustrated. The exemplary zero skipping sparsity computation can be a vector-vector multiplication between a first vector and a plurality of additional vectors. For example, the vector-vector multiplication can be between a weight vector (Vector1) and a plurality of feature maps (Vectors2, Vector3, etc.).

TABLE 3

|  | 0 | 1 | 2 | 3 | 4 | 5 | ... | N-1 | N |
|---|---|---|---|---|---|---|---|---|---|
| Vector1 | 5E−04 | 800.2 | 3.65 | 0.001 | 10.5 | 1E−08 | ... | 56.3 | 2E−05 |
| Mask1 | 0 | 1 | 1 | 0 | 1 | 0) | ... | 1 | 0 |
| Vector2 | 9556 | 0.01 | 62.3 | 7E−04 | 9E−04 | 1.35 | ... | 8.52 | 0.005 |
| Mask2 | 1 | 0 | 1 | 0 | 0 | 1 | ... | 1 | 0 |
| Comp Mask1 | 0 | 0 | 1 | 0 | 0 | 0 | ... | 1 | 0 |
| Vector1 Given Elements | 3.65 | 56.3 |  |  |  |  |  |  |  |
| Vector2 Given Elements | 62.3 | 8.52 |  |  |  |  |  |  |  |
| 1$^{st}$ Result Elements | 227.4 | 479.7 |  |  |  |  |  |  |  |
| Vector3 | 0.0054 | 0.01 | 2654.1 | 154 | 54721 | 0.0056 | ... | 6854.7 | 0.0045 |
| Mask3 | 0 | 0 | 1 | 1 | 1 | 0 | ... | 1 | 0 |
| Comp Mask2 | 0 | 0 | 1 | 0 | 1 | 0 | ... | 1 | 0 |
| Vector1 Given Elements | 3.65 | 10.5 | 56.3 |  |  |  |  |  |  |
| Vector3 Given Elements | 2654.1 | 54721 | 6854.7 |  |  |  |  |  |  |
| 2$^{nd}$ Result Elements | 9687.5 | 574571 | 385920 |  |  |  |  |  |  |

As described above, first and second masks (Mask1 and Mask2) can be generated by the memory based on the zero and near-zero element values in the first and second vectors (Vector1 and Vector2) respectively. The first and second masks (Mask1 and Mask2) along with the given elements corresponding to the non-zero indicators in the first and second masks (Mask1 and Mask2) can be sent from the memory to the accelerator. For example, the given elements 3.65 and 56.3, of the first vector (Vector1), corresponding to the non-zero indicators in the first mask (Mask1), and the given elements 62.3 and 8.52, corresponding to the non-zero indicators in the second mask (Mask2) can be sent to the accelerator along with the first and second masks (Mask1 and Mask2). The accelerator can generate a first computation zero mask for multiplication of the first and second vectors (Vector1 and Vector2). The accelerator can then perform multiplication of the given elements that correspond to non-zero indicators in the first computation zero mask to generate first result elements 2654.1, 54721 and 6854.7. Next, the memory can generate a third mask (Mask3) based on the zero and near-zero element values in a third vector (Vector3). The third mask (Mask3) along with the given elements corresponding to the non-zero indicators in the third mask (Mask3) can be sent form the memory to the accelerator. For example, the given elements 2654.1, 154, 54721 and 6854.7, of the third vector (Vector3), corresponding to the non-zero indicators in the third mask (Mask3) can be sent to the accelerator along with the third mask (Mask3). The accelerator can generate a second computation zero mask for multiplication of the first and third vectors (Vector1 and Vector3). The accelerator can then perform multiplication of the given elements that correspond to non-zero indicators in the second computation zero mask to generate second result elements 9687.5, 574571 and 385920.

Aspects of the present technology can advantageously improve performance when computing scalar, vector, matrix and the like operations utilizing sparsity vectors, matrix and the like. Aspect of the present technology advantageously reduce data transmission between accelerators and memory, and reduce computation by the accelerators. Accordingly, aspects of the present technology can advantageously improve performance of computing system in artificial intelligence (AI), machine learning (ML) and the like applications that utilized sparse vectors, matrixes and the like.

The following examples pertain to specific technology embodiments and point out specific features, elements, or steps that may be used or otherwise combined in achieving such embodiments.

Example 1 includes a processor comprising: a processor sparsity control unit configured to wrap memory access request in a zero skipping sparsity command; a command interface configured to transmit the zero skipping sparsity command and receive given elements from a first set of elements and second set of elements; the processor configured to perform a computation operation on respective given elements of the first set of elements and the second set of elements to generate result elements; and the command interface further configured to transmit the result elements.

Example 2 includes the processor according to Example 1, wherein: the first set of elements comprise a one of a scalar, a vector or a matrix; and the second set of elements comprise one of a scalar, a vector or a matrix.

Example 3 includes the processor according to Example 1, wherein the computation operation comprises one of an addition, a subtraction, a multiplication or a division operation.

Example 4 includes the processor according to Example 1, wherein the processor sparsity control unit includes: a zero skipping command unit configured to generate the zero skipping sparsity command including a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

Example 5 includes a memory comprising: a memory cell array; a command interface configured to receive a zero skipping sparsity command; a memory sparsity control unit configured to: access a first set of elements in the memory cell array, determine zero and near-zero element values in the first set and generate a first zero element mask based on the determined zero and near-zero elements of the first set of elements; access a second set of elements in the memory cell array, determine zero and near-zero element values in the second set of elements and generate a second zero element mask based on the determined zero and near-zero elements of the second set of elements; generate a computation zero mask based on a computation operation of the zero skipping sparsity command, the first zero element mask and the second zero element mask; and write zero values based on the computation zero mask as a part of computation results to the memory cell array; the command interface further configured to transmit given elements from the first and second sets of elements corresponding to non-zero indicators in the computation zero mask and receive result elements; and the memory sparsity control unit further configured to write the result elements as an additional part of computation results of the first and second sets of elements based on the computation zero mask to the memory cell array.

Example 6 includes the memory according to Example 5, further comprising: a zero counting unit of the memory sparsity control unit configured to determine zero and near-zero element values based on a near-zero threshold and a data type of the first and second sets of elements.

Example 7 includes the memory according to Example 6, further comprising: a mask information handler of the memory sparsity control unit configured to generate the first zero element mask wherein zero and near-zero elements in the first set of elements are indicated by a first state and non-zero elements in the first set of elements are indicated by a second state, and to generate the second zero element mask wherein zero and near-zero elements in the second set of elements are indicated by the first state and non-zero elements in the second set of elements are indicated by the second state.

Example 8 includes the memory according to Example 5, wherein the zero skipping sparsity command includes a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

Example 9 includes the memory according to Example 5, further comprising: a write back control unit of the memory sparsity control unit configured to: write the zero values based on the computation zero mask as the part of computation results to the memory cell array; and write the result elements as the additional part of computation results of the first and second sets of elements based on the computation zero mask to the memory cell array.

Example 10 includes a zero skipping sparsity computation accelerator method comprising: generating a zero skipping sparsity command wrapping a memory access request; transmitting the zero skipping sparsity command; receiving given element from a first set of elements and given elements from a second set of elements in response to the zero skipping sparsity command; performing a computation operation on respective given elements from the first and second sets of elements to generate result elements; and transmitting the result elements.

Example 11 includes the zero skipping sparsity computation accelerator method of Example 10, wherein the zero skipping sparsity command includes a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

Example 12 includes the zero skipping sparsity computation accelerator method of Example 11, wherein the zero skipping sparsity command further includes near-zero threshold (NZ_Th) value.

Example 13 includes the zero skipping sparsity computation accelerator method of Example 10, wherein the computation operation comprises one of an addition, a subtraction, a multiplication or a division operation.

Example 14 includes the zero skipping sparsity computation accelerator method of Example 13, wherein: the first set of elements comprise a one of a scalar, a vector or a matrix; and the second set of elements comprise one of a scalar, a vector or a matrix.

Example 15 includes a zero skipping sparsity computation memory method comprising: receiving a zero skipping sparsity command wrapping a memory access request; accessing a first set of elements in response to the zero skipping sparsity command, determining zero and near-zero elements in the first set of elements, and generating a first zero element mask based on the determined zero and near-zero element values of the first set of elements; accessing a second set of elements in response to the zero skipping command, determining zero and near-zero elements in the second set of elements, and generating a second zero element mask based on the determined zero and near-zero element values of the second set of elements; generating a computation zero mask based on a computation operation of the zero skipping sparsity command, the first zero element mask and the second zero element mask; writing zero values based on the computation zero mask as a corresponding part of computation results of first and second set of elements; transmitting given elements from the first and second set of elements corresponding to non-zero indicators in the computation zero mask; receive result elements; and write the result elements as an additional part of the computation results of the first and second set of elements based on the computation zero mask.

Example 16 includes the zero skipping sparsity computation memory method of Example 15, wherein the computation operation comprises one of an addition, a subtraction, a multiplication or a division operation.

Example 17 includes the zero skipping sparsity computation memory method of Example 15, wherein: the first set of elements comprise a one of a scalar, a vector or a matrix; and the second set of elements comprise one of a scalar, a vector or a matrix.

Example 18 includes the zero skipping sparsity computation memory method of Example 15, wherein the zero skipping sparsity command including a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

Example 19 includes the zero skipping sparsity computation memory method of Example 15, wherein zero and near-zero element values are determined based on a near-zero threshold and a data type of the first and second sets of elements.

Example 20 includes the zero skipping sparsity computation memory method of Example 15, wherein zero and near-zero elements in the first set of elements are indicated by a first state and non-zero elements in the first set of elements are indicated by a second state in the first zero element mask, and zero and near-zero elements in the second set of elements are indicated by the first state and non-zero elements in the second set of elements are indicated by the second state in the second zero element mask.

Example 21 includes a processor comprising: a processor sparsity control unit configured to generate a first zero skipping sparsity command wrapping a memory access request; a command interface configured to transmit the first zero skipping sparsity command, receive a first zero element mask and given elements from a first set of elements, and receive a second zero element mask and given elements from a second set of elements; the processor sparsity control unit further configured to generate a first computation zero mask based on a computation operation of the first zero skipping sparsity command, the first zero element mask and the second zero element mask; the processor configured to perform the computation operation on respective given elements of the first set of elements and the second set of elements to generate first result elements; and the command interface further configured to transmit the first result elements.

Example 22 includes the processor according to Example 21, further comprising: the processor sparsity control unit further configured to generate a second zero skipping sparsity command wrapping a memory access request; the command interface further configured to transmit the second zero skipping sparsity command and receive a third zero element mask and given elements of a third set of elements; the processor sparsity control unit further configured to generate a second computation zero mask based on a computation operation of the second zero skipping sparsity command, the first zero element mask and the third zero element mask; the processor configured to perform the computation operation on respective given elements of the first set of elements and the third set of elements to generate second result elements; and the command interface further configured to transmit the second result elements.

Example 23 includes the processor according to Example 22, wherein the computation operation comprises one of an addition, a subtraction, a multiplication or a division operation.

Example 24 includes a memory comprising: a memory cell array; a command interface configured to receive a first zero skipping sparsity command; a memory sparsity control unit configured to: access a first set of elements in the memory cell array, determine zero and near-zero element values in the first set and generate a first zero element mask based on the determined zero and near-zero elements of the first set of elements; and access a second set of elements in the memory cell array, determine zero and near-zero element values in the second set of elements and generate a second zero element mask based on the determined zero and near-zero elements of the second set of elements; the command interface further configured to transmit given elements from the first set of elements corresponding to non-zero indicators in the first zero element mask, transmit the first zero element mask, transmit given elements from the second set of elements corresponding to non-zero indicators in the second zero element mask, transmit the second zero element mask and receive first result elements; and the memory sparsity control unit further configured to write the first result elements as computation results of the first and second sets of elements to the memory cell array.

Example 25 includes the memory according to Example 24, further comprising: the command interface further configured to receive a second zero skipping sparsity command;

the memory sparsity control unit further configured to: access a third set of elements in the memory cell array, determine zero and near-zero element values in the third set of elements and generate a third zero element mask based on the determined zero and near-zero elements of the third set of elements; the command interface further configured to transmit given elements from the third set of elements corresponding to non-zero indicators in the third zero element mask, transmit the third zero element mask, and receive second result elements; and the memory sparsity control unit further configured to write the second result elements as computation results of the first and third sets of elements to the memory cell array.

Example 26 includes the memory according to Example 24, further comprising: a zero counting unit of the memory sparsity control unit configured to determine zero and near-zero element values based on a near-zero threshold and a data type of the first, second and third sets of elements.

Example 27 includes a zero skipping sparsity computation accelerator method comprising: generating a first zero skipping sparsity command wrapping a memory access request; transmitting the first zero skipping sparsity command; receiving given elements from a first set of elements, a first zero element mask, given elements from a second set of elements and second zero element mask in response to the first zero skipping sparsity command; generating a first computation zero mask based on a computation operation from of the first zero skipping sparsity command, the first zero element mask and the second zero element mask; performing the computation operation on respective given elements from the first and second sets of elements based on the first computation mask to generate first result elements; and transmitting the first result elements.

Example 28 includes the zero skipping sparsity computation accelerator method of Example 27, further comprising: generating a second zero skipping sparsity command wrapping a memory access request; transmitting the second zero skipping sparsity command; receiving given elements from a third set of elements and a third zero element mask in response to the second zero skipping sparsity command; generating a second computation zero mask based on a computation operation of the second zero skipping sparsity command, the first zero element mask and the third zero element mask; performing the computation operation on respective given elements from the first and third sets of elements based on the second computation mask to generate second result elements; and transmitting the second result elements.

Example 29 includes the zero skipping sparsity computation accelerator method of Example 27, wherein the computation operation comprises one of an addition, a subtraction, a multiplication or a division operation.

Example 30 includes a zero skipping sparsity computation memory method comprising: receiving a first zero skipping sparsity command wrapping a memory access request; accessing a first set of elements in response to the first zero skipping command, determining zero and near-zero elements in the first set of elements, and generating a first zero element mask based on the determined zero and near-zero element values of the first set of elements; accessing a second set of elements in response to the first zero skipping command, determining zero and near-zero elements in the second set of elements, and generating a second zero element mask based on the determined zero and near-zero element values of the second set of elements; transmitting given elements from the first set of elements corresponding to non-zero indicators in the first zero element mask, the first zero element mask, given elements from the second set of elements corresponding to non-zero indicators in the second zero element mask; receive first result elements and a first computation zero mask; and write the first result elements based on the first computation zero mask.

Example 31 includes the zero skipping sparsity computation memory method of Example 30, further comprising: receiving a second zero skipping sparsity command wrapping a memory access request; accessing a third set of elements in response to the second zero skipping command, determining zero and near-zero elements in the third set of elements, and generating a third zero element mask based on the determined zero and near-zero element values of the third set of elements; transmitting given elements from the third set of elements corresponding to non-zero indicators in the third zero element mask and the third zero element mask; receive second result elements and a second computation zero mask; and write the second result elements based on the second computation zero mask.

Example 32 includes the zero skipping sparsity computation memory method of Example 30, wherein the computation operation comprises one of an addition, a subtraction, a multiplication or a division operation.

Example 33 includes a zero skipping sparsity computation system comprising: a processor including: a processor sparsity control unit configured to wrap memory access request in a zero skipping sparsity command; a command interface configured to transmit the zero skipping sparsity command and receive given elements from a first set of elements and second set of elements; the processor configured to perform a computation operation on respective given elements of the first set of elements and the second set of elements to generate result elements; and the command interface further configured to transmit the result elements; and a memory including: a memory cell array; a command interface configured to receive the zero skipping sparsity command; a memory sparsity control unit configured to: access the first set of elements in the memory cell array, determine zero and near-zero element values in the first set and generate a first zero element mask based on the determined zero and near-zero elements of the first set of elements; access the second set of elements in the memory cell array, determine zero and near-zero element values in the second set of elements and generate a second zero element mask based on the determined zero and near-zero elements of the second set of elements; generate a computation zero mask based on a computation operation of the zero skipping sparsity command, the first zero element mask and the second zero element mask; and write zero values based on the computation zero mask as a part of computation results to the memory cell array; the command interface further configured to transmit given elements from the first and second sets of elements corresponding to non-zero indicators in the computation zero mask and the receive result elements; and the memory sparsity control unit further configured to write the result elements as an additional part of computation results of the first and second sets of elements based on the computation zero mask to the memory cell array.

Example 34 includes a zero skipping sparsity computation system comprising: a processor including: a processor sparsity control unit configured to generate a first zero skipping sparsity command wrapping a memory access request; a command interface configured to transmit the first zero skipping sparsity command, receive a first zero element mask and given elements from a first set of elements, and receive a second zero element mask and given elements from a second set of elements; the processor sparsity control unit further configured to generate a first computation zero mask based on a computation operation of the first zero skipping sparsity command, the first zero element mask and the second zero element mask; the processor configured to perform the computation operation on respective given elements of the first set of elements and the second set of elements to generate first result elements; and the command interface further configured to transmit the first result elements; and a memory including: a memory cell array; a command interface configured to receive the first zero skipping sparsity command; a memory sparsity control unit configured to: access the first set of elements in the memory cell array, determine zero and near-zero element values in the first set and generate a first zero element mask based on the determined zero and near-zero elements of the first set of elements; and access the second set of elements in the memory cell array, determine zero and near-zero element values in the second set of elements and generate a second zero element mask based on the determined zero and near-zero elements of the second set of elements; the command interface further configured to transmit given elements from the first set of elements corresponding to non-zero indicators in the first zero element mask, transmit the first zero element mask, transmit given elements from the second set of elements corresponding to non-zero indicators in the second zero element mask, transmit the second zero element mask and receive the first result elements; and the memory sparsity control unit further configured to write the first result elements as computation results of the first and second sets of elements to the memory cell array.

Example 35 includes the zero skipping sparsity computation system according to Example 34, further comprising: the processor including: the processor sparsity control unit further configured to generate a second zero skipping sparsity command wrapping a memory access request; the command interface further configured to transmit the second zero skipping sparsity command and receive a third zero element mask and given elements of a third set of elements; the processor sparsity control unit further configured to generate a second computation zero mask based on a computation operation of the second zero skipping sparsity command, the first zero element mask and the third zero element mask; the processor configured to perform the computation operation on respective given elements of the first set of elements and the third set of elements to generate second result elements; and the command interface further configured to transmit the second result elements; and the memory including: the command interface further configured to receive the second zero skipping sparsity command; the memory sparsity control unit further configured to: access the third set of elements in the memory cell array, determine zero and near-zero element values in the third set of elements and generate a third zero element mask based on the determined zero and near-zero elements of the third set of elements; the command interface further configured to transmit given elements from the third set of elements corresponding to non-zero indicators in the third zero element mask, transmit the third zero element mask, and receive second result elements; and the memory sparsity control unit further configured to write the second result elements as computation results of the first and third sets of elements to the memory cell array.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:
1. A processor comprising:
a processor sparsity control unit configured to generate a zero skipping sparsity command, wherein the zero skipping sparsity command includes a memory access request; and
a command interface configured to:
transmit the zero skipping sparsity command to a memory based on the memory access request, wherein the zero skipping sparsity command comprises a zero skipping command identifier (TAGID) and a computation operation code (OP); and
receive from the memory, given elements from a first set of elements and a second set of elements and the zeroskipping command identifier (TAGID), in response to the zero skipping sparsity command, wherein the zeroskipping command identifier (TAGID) identifies the zero skipping sparsity command;
wherein the processor is further configured to:
perform a computation operation based on the computation operation code (OP) of the zero skipping sparsity command, on the received given elements of the first set of elements and the second set of elements to generate result elements, and
wherein the command interface is further configured to transmit the result elements and the zeroskipping command identifier (TAGID) to the memory.
2. The processor according to claim 1, wherein:
the first set of elements comprise a one of a scalar, a vector or a matrix; and
the second set of elements comprise one of a scalar, a vector or a matrix;
wherein the computation operation comprises one of an addition, a subtraction, a multiplication or a division operation.
3. The processor according to claim 1, wherein the processor sparsity control unit comprises:
a zero skipping command unit configured to generate the zero skipping sparsity command further comprising a data type of the first and second set of elements (DataType), an address of the first set of elements (Addr1), an address of the second set of elements (Addr2), a destination address for the result of the computation (Addrdst), and a data length (length), wherein after the zero skipping sparsity command is transmitted to the memory, the memory is configured to:
access the first set of elements stored in a memory cell array based on the address of the first set of elements (Addr1) and the data length (length) specified in the zero skipping sparsity command,
determine zero and near-zero values in the first set of elements based on the data type of the first set of elements (DataType) specified in the zero skipping sparsity command, generate a first zero element mask wherein the zero and near-zero element values are indicated by a first state and non-zero values are indicated by a second state, access the second set of elements stored in the memory cell array based on the address of the second set of elements (Addr2) and the data length (length) specified in the zero skipping sparsity command, determine zero and non-zero values in the second set of elements based on the data type of the second set of elements (DataType) specified in the zero skipping sparsity command, generate a second zero element mask wherein the zero and near-zero element values are indicated by a first state and non-zero values are indicated by a second state, generate a computation zero mask based on the computation operation code (OP) specified in the zero skipping sparsity command, the first zero element mask, and the second zero element mask, write back zero values to corresponding element locations, of the first and second set of elements, at the destination address (Addrdst) specified in the zero skipping sparsity command for any indicators in the computation zero mask that are set to the first state, and transmit the zero skipping command identifier (TAGID) and the given elements from the first and second set of elements, corresponding to non-zero indicators in the computation zero mask set to the second state, to the processor.

4. A memory comprising:
a memory cell array;
a command interface configured to receive a zero skipping sparsity command;
a memory sparsity control unit configured to:
  access a first set of elements in the memory cell array, determine zero and near-zero element values in the first set and generate a first zero element mask based on the determined zero and near-zero elements of the first set of elements;
  access a second set of elements in the memory cell array, determine zero and near-zero element values in the second set of elements and generate a second zero element mask based on the determined zero and near-zero elements of the second set of elements;
  generate a computation zero mask based on a computation operation of the zero skipping sparsity command, the first zero element mask and the second zero element mask; and
  write zero values based on the computation zero mask as a part of computation results to the memory cell array;
the command interface further configured to transmit given elements from the first and second sets of elements corresponding to non-zero indicators in the computation zero mask and receive result elements; and
the memory sparsity control unit further configured to write the result elements as an additional part of computation results of the first and second sets of elements based on the computation zero mask to the memory cell array.

5. The memory according to claim 4, further comprising:
a zero counting unit of the memory sparsity control unit configured to determine zero and near-zero element values based on a near-zero threshold and a data type of the first and second sets of elements.

6. The memory according to claim 5, further comprising:
a mask information handler of the memory sparsity control unit configured to generate the first zero element mask wherein zero and near-zero elements in the first set of elements are indicated by a first state and non-zero elements in the first set of elements are indicated by a second state, and to generate the second zero element mask wherein zero and near-zero elements in the second set of elements are indicated by the first state and non-zero elements in the second set of elements are indicated by the second state.

7. The memory according to claim 4, wherein the zero skipping sparsity command comprises a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

8. The memory according to claim 4, further comprising:
a write back control unit of the memory sparsity control unit configured to:
  write the zero values based on the computation zero mask as the part of computation results to the memory cell array; and
  write the result elements as the additional part of computation results of the first and second sets of elements based on the computation zero mask to the memory cell array.

9. A zero skipping sparsity computation accelerator method comprising:
  generating a zero skipping sparsity command, wherein the zero skipping sparsity command includes a memory access request;
  transmitting the zero skipping sparsity command to a memory based on the memory access request, wherein the zero skipping sparsity command comprises a zero skipping command identifier (TAGID) and a computation operation code (OP);
  receiving, from the memory, given elements from a first set of elements and given elements from a second set of elements, and the zeroskipping command identifier (TAGID), in response to the zero skipping sparsity command, wherein the zeroskipping command identifier (TAGID) identifies the zero skipping sparsity command;
  performing a computation operation based on the computation operation code (OP) of the zero skipping sparsity command, on the received given elements of the first and second sets of elements to generate result elements; and
  transmitting the result elements and the zeroskipping command identifier (TAGID) to the memory.

10. The zero skipping sparsity computation accelerator method of claim 9, wherein the zero skipping sparsity command further comprises a data type of the first and second set of elements (DataType), an address of the first set of elements (Addr1), an address of the second set of elements (Addr2), a destination address for the result of the computation (Addrdst), and a data length (length), wherein transmitting the zero skipping sparsity command to the memory further comprises at the memory:
  accessing the first set of elements stored in a memory cell array based on the address of the first set of elements (Addr1) and the data length (length) specified in the zero skipping sparsity command, determining zero and near-zero values in the first set of elements based on the data type of the first set of elements (DataType) specified in the zero skipping sparsity command, generating a first zero element mask wherein the zero and near-zero element values are indicated by a first state and non-zero values are indicated by a second state, accessing the second set of elements stored in the memory cell array based on the address of the second set of elements (Addr2) and the data length (length) specified in the zero skipping sparsity command, determining zero and non-zero values in the second set of elements based on the data type of the second set of elements (DataType) specified in the zero skipping sparsity command, generating a second zero element mask wherein the zero and near-zero element values are indicated by a first state and non-zero values are indicated by a second state, generating a computation zero mask based on the computation operation code (OP) specified in the zero skipping sparsity command, the first zero element mask, and the second zero element mask, writing back zero values to corresponding element locations, of the first and second set of elements, at the destination address (Addrdst) specified in the zero skipping sparsity command for any indicators in the computation zero mask that are set to the first state, and transmitting the zero skipping command identifier (TAGID) and the given elements from the first and second set of elements, corresponding to non-zero indicators in the computation zero mask set to the second state, to the processor.

11. The zero skipping sparsity computation accelerator method of claim 10, wherein the zero skipping sparsity command further comprises near-zero threshold (NZ_Th) value.

12. The zero skipping sparsity computation accelerator method of claim 9, wherein the computation operation comprises one of an addition, a subtraction, a multiplication or a division operation.

13. The zero skipping sparsity computation accelerator method of claim 12, wherein:
the first set of elements comprise a one of a scalar, a vector or a matrix; and
the second set of elements comprise one of a scalar, a vector or a matrix.

14. A zero skipping sparsity computation memory method comprising:
receiving a zero skipping sparsity command wrapping a memory access request;
accessing a first set of elements in response to the zero skipping command, determining zero and near-zero elements in the first set of elements, and generating a first zero element mask based on the determined zero and near-zero element values of the first set of elements;
accessing a second set of elements in response to the zero skipping command, determining zero and near-zero elements in the second set of elements, and generating a second zero element mask based on the determined zero and near-zero element values of the second set of elements;
generating a computation zero mask based on a computation operation of the zero skipping sparsity command, the first zero element mask and the second zero element mask;

writing zero values based on the computation zero mask as a corresponding part of computation results of first and second set of elements;

transmitting given elements from the first and second set of elements corresponding to non-zero indicators in the computation zero mask;

receiving result elements; and writing the result elements as an additional part of the computation results of the first and second set of elements based on the computation zero mask.

15. The zero skipping sparsity computation memory method of claim 14, wherein the computation operation comprises one of an addition, a subtraction, a multiplication or a division operation.

16. The zero skipping sparsity computation memory method of claim 14, wherein:
the first set of elements comprise a one of a scalar, a vector or a matrix; and
the second set of elements comprise one of a scalar, a vector or a matrix.

17. The zero skipping sparsity computation memory method of claim 14, wherein the zero skipping sparsity command comprising a zero skipping command identifier (TAGID), a computation operation code (OP), a data type of a first and second set of elements (DataType), an address of the first set of elements (Addr1), an address of the second set of elements (Addr2), a destination address for the result of the computation (Addrdst), and a data length (length).

18. The zero skipping sparsity computation memory method of claim 14, wherein zero and near-zero element values are determined based on a near-zero threshold and a data type of the first and second sets of elements.

19. The zero skipping sparsity computation memory method of claim 14, wherein zero and near-zero elements in the first set of elements are indicated by a first state and non-zero elements in the first set of elements are indicated by a second state in the first zero element mask, and zero and near-zero elements in the second set of elements are indicated by the first state and non-zero elements in the second set of elements are indicated by the second state in the second zero element mask.

20. A zero skipping sparsity computation system comprising:
a processor comprising:
a processor sparsity control unit configured to wrap memory access request in a zero skipping sparsity command; and
an accelerator command interface configured to transmit the zero skipping sparsity command and receive given elements from a first set of elements and second set of elements;
wherein the processor is further configured to perform a computation operation on respective given elements of the first set of elements and the second set of elements to generate result elements, and
wherein the accelerator command interface is further configured to transmit the result elements to a memory; and
the memory comprising:
a memory cell array;
a command interface configured to receive the zero skipping sparsity command; and
a memory sparsity control unit configured to:
access the first set of elements in the memory cell array, determine zero and near-zero element values in the first set and generate a first zero element mask based on the determined zero and near-zero elements of the first set of elements;

access the second set of elements in the memory cell array, determine zero and near-zero element values in the second set of elements and generate a second zero element mask based on the determined zero and near-zero elements of the second set of elements;

generate a computation zero mask based on a computation operation of the zero skipping sparsity command, the first zero element mask and the second zero element mask; and write zero values based on the computation zero mask as a part of computation results to the memory cell array;

wherein the command interface is further configured to transmit given elements from the first and second sets of elements corresponding to non-zero indicators in the computation zero mask and the receive result elements, and wherein the memory sparsity control unit is further configured to write the result elements as an additional part of computation results of the first and second sets of elements based on the computation zero mask to the memory cell array.

* * * * *